United States Patent Office 3,553,021
Patented Jan. 5, 1971

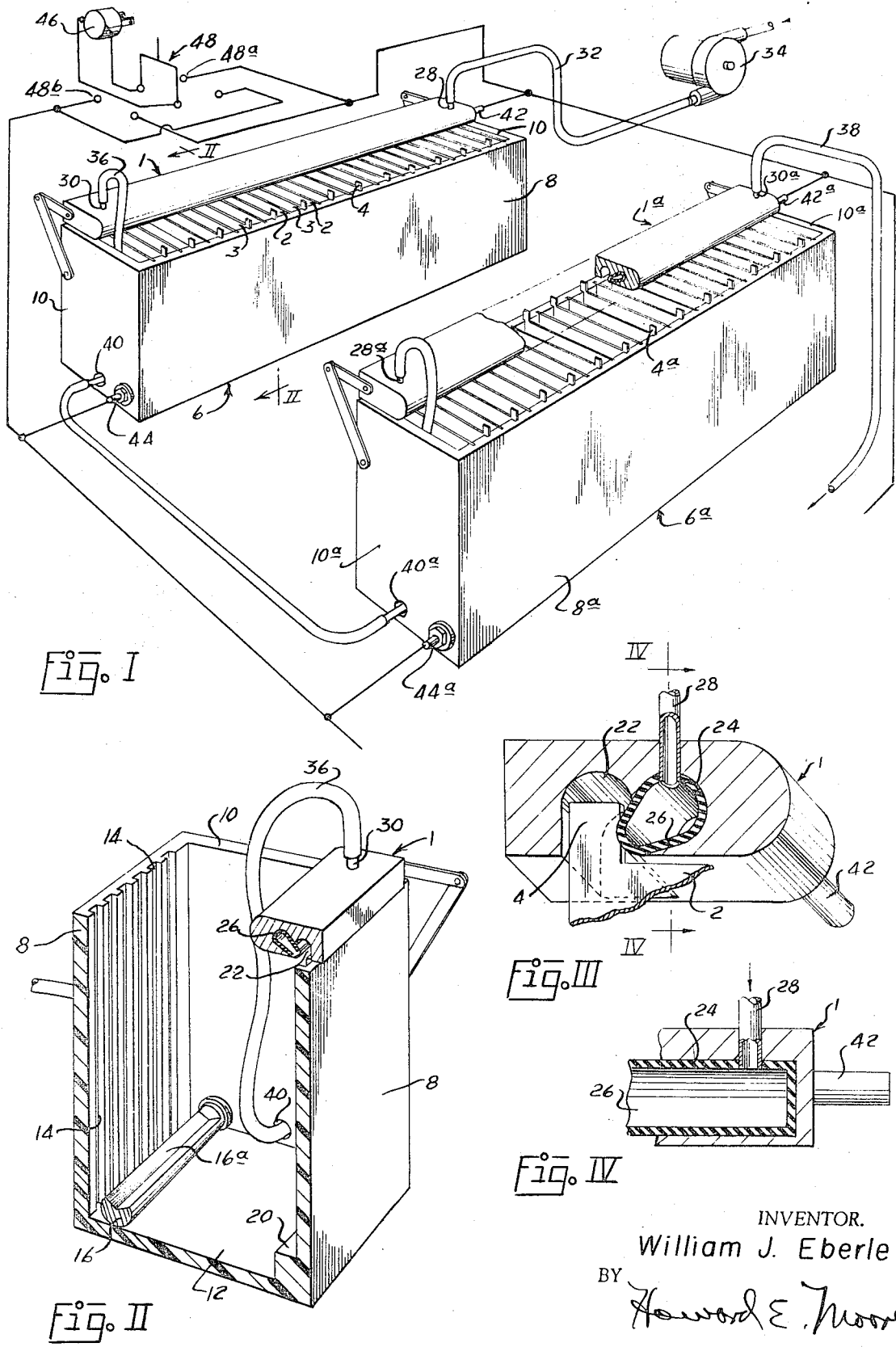

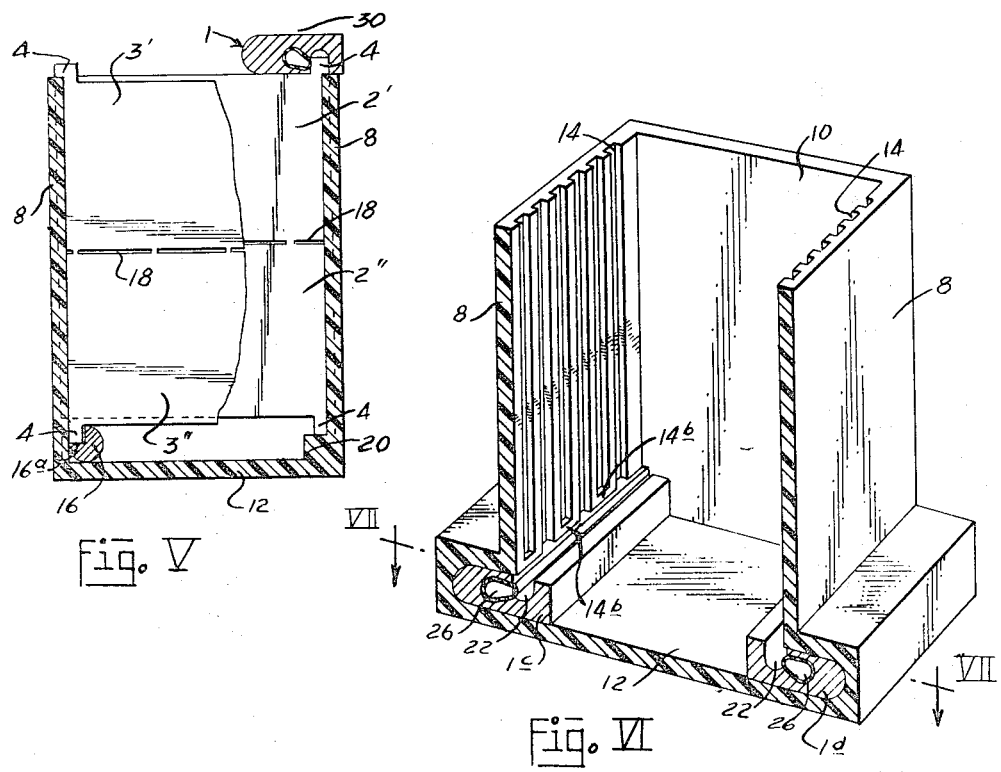
Fig. V
Fig. VI
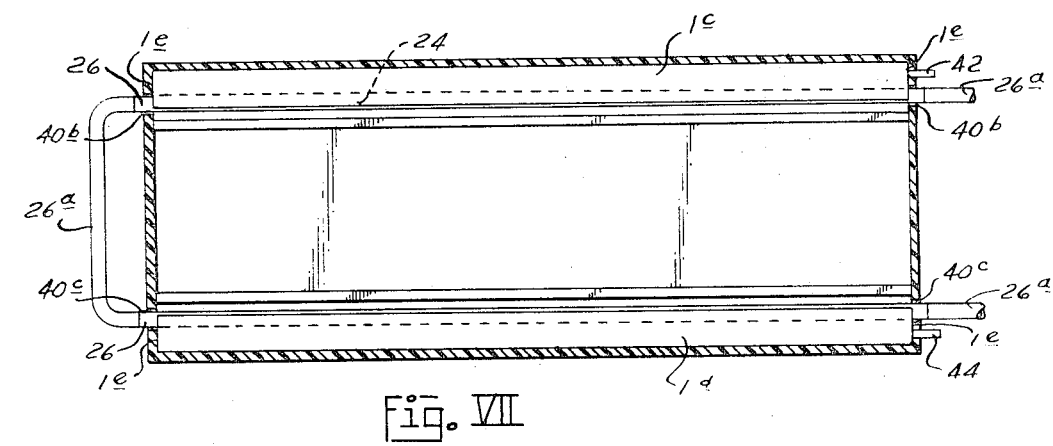
Fig. VII
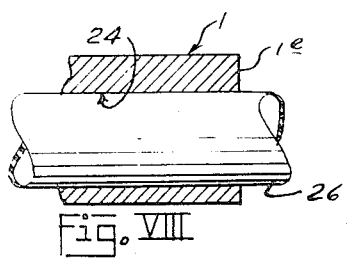
Fig. VIII
*INVENTOR.*
*WILLIAM J. EBERLE*
BY Howard E. Moore
*ATTORNEY*

3,553,021
CHARGE BAR CONNECTION FOR BATTERY PLATES
William J. Eberle, 1013 Slocum St., Dallas, Tex. 75207
Filed Sept. 26, 1968, Ser. No. 762,703
Int. Cl. H01m *35/18;* H01r *3/04*
U.S. Cl. 136—82                                 11 Claims

ABSTRACT OF THE DISCLOSURE

A charge bar connection for battery plates, comprising an expandable tube extending through a conductor for electrical current, whereby a connection is achieved by inflation of the tube, causing it to expand, thereby clamping outwardly extending connector lugs on the plates.

BACKGROUND OF THE INVENTION

The cells of a lead plate storage battery in the fully charged state consist of sets of positive plates of lead dioxide and sets of negative plates of metallic lead. The materials are coated on grids of highly porous metallic lead and are prepared so that the electrolyte gains full access to the plates over a maximum surface area.

Lead plates or grids are usually positioned in parallel, spaced apart relation in a tank of electrolyte which is a substance in which the conduction of electricity is accomplished by chemical decomposition of the electrolyte. Electrical current is passed through the plates by connecting alternate plates to positive and negative terminals of a source of electrical current. As current flows between the plates through the electrolyte electrolytic deposition is achieved to form the plates.

Heretofore a major problem in dry plate formation has been the inability to achieve an efficient means for connecting the charge bar to plates submerged in an electrolyte which may be easily and quickly connected and disconnected without damaging plates while assuring uniform formation of 100% of the surface area of the plates.

It is common practice to solder an electrical conductor to each plate to accomplish a good connection and to break the joint after the plates have been formed. This method of forming an electrical connection is very tedious and time-consuming and a substantial number of plates are damaged when the solder joints are broken.

SUMMARY OF THE INVENTION

I have developed a novel charge bar for dry plate formation which comprises an elongated electrical conductor having a groove cut therein into which the upstanding lugs of plates to be formed may be inserted and an expandable tube extending axially through the conductor adjacent tht groove whereby low pressure air may be utilized to inflate the tube, causing it to expand, thereby clamping the lugs on the plates in the groove, forming a positive electrical contact which may be quickly and efficiently connected and disconnected without damage to the plates.

It is therefore a primary object of the present invention to provide an improved connection for joining a charge bar and grids upon which electrolytic deposition is to be achieved for dry plate formation.

A further object of the invention is to provide a charge bar whereby electrical connections and disconnections can be quickly and easily made.

A further object of the invention is to provide a charge bar wherein an electrical connection is automatically made by forces exerted by air pressure.

A further object of the invention is to provide a charge bar in which connections can be simultaneously made with a plurality of plates.

A further object of the invention is to provide a charge bar which may be quickly and easily disconnected from plates without any appreciable damage to the plates.

A still further object of the invention is to provide a charge bar wherein electrical connection is broken by the release of air pressure.

A still further object of the invention is to provide a charge bar having an expandable tube which extends throughout the length of the charge bar and through a drain hole in a lower portion of the electrolyte tank whereby the drain hole is closed upon inflation of the tube and is opened as the air pressure is released to deflate the tube, which breaks the electrical connection between the charge bar and plates and simultaneously drains the tank.

Other and further objects of the invention will become apparent upon reading the following detailed specification in conjunction with the drawing.

DESCRIPTION OF THE DRAWING

The accompanying drawings of a preferred embodiment of the present invention are provided so that the invention may be better and more fully understood, in which:

FIG. I is a perspective view of a plurality of forming tanks illustrating the relationship of charge bars thereto, FIG. II is a transverse cross sectional view taken along lines II—II of FIG. I through one of the tanks with the plates removed, FIG. III is an enlarged cross sectional view through a charge bar, and FIG. IV is a sectional view taken along lines IV—IV of FIG. III.

FIG. V is a cross sectional view taken along lines II—II of FIG. I showing plates in contact with the respective charge bars, FIG. VI is a cross sectional view of a second embodiment, FIG. VII is a cross sectional view taken along lines VII—VII of FIG. VI, and FIG. VIII is a cross sectional view similar to FIG. IV of the second embodiment.

Numeral references are employed to indicate the various parts shown in the drawing and like numerals indicate like parts throughout the various figures of the drawing.

DESCRIPTION OF A PREFERRED EMBODIMENT

Referring to FIG. I of the drawing numeral 1 generally designates a charge bar incorporating the present invention.

Although the general concept of the present invention has many applications and can be used elsewhere, the following description is limited to use in relation to the process utilized for electrolytic formation of plates to be used in storage batteries.

Plates 2 and 3 are generally of a flat rectangular configuration having lugs 4 extending outwardly from the opposite corners of one side thereof providing terminals to which the charge bar may be connected. As best seen in FIG. I of the drawing, plates 2 and 3 are positioned in spaced apart relation in an electrolyte tank 6, which may be constructed of any suitable material which is non-conductive and resistant to chemical reaction with the electrolyte, such as polypropylene or acrylic plastic. The tank 6 may be of generally rectangular configuration having sides 8 joined by ends 10 and a bottom 12. The sides 8 of tank 6 have vertical grooves 14 formed therein into which the plates 2 and 3 may be inserted.

As best seen in FIG. II of the drawing, grooves 14 hold plates 2 and 3 in substantially parallel spaced apart relation, preventing contact between adjacent plates. When the plates 2 and 3 are positioned in grooves 14, the lugs 4 on one side of plates 2 and 3 are staggered throughout the length of the tank 6 whereby the lugs 4 of alternate plates 2 are positioned on opposite sides of the tank from the lugs 4 on plates 3. The lugs 4 on plates 3 are supported by a lower charge bar 16 which extends longitudinally through the tank 6 adjacent the bottom 12 thereof.

It is often desirable to provide perforations 18 throughout a center portion of each plate 2 and 3 forming an upper portion 2', 3', and a lower portion 2'', 3'', which may be separated after the plates are formed, making it desirable to have a lug 4 positioned at each end of a side of the sheet. A support 20 is provided to maintain spacing between the bottom of sheets 2 and 3 and the bottom 12 of the tank whereby the electrolyte is not captured between plates and to space positive plates 2 above charge bar 16 to prevent contact therebetween.

As best seen in FIG. V, the lower lug 4 on positive plates 2 rest upon shoulder support 20 thereby positioning the positive plates in grooves 14 while holding the positive plates above negative charge bar 16. The lugs 4 on negative plates 3 rest upon surface 16a on the negative charge bar 16 while being positioned in grooves 14 below and out of contact with positive charge bar 1 at the top of tank 6.

It should be apparent that alternate plates 2 are connected to the positive charge bar 1 while alternate plates 3 are connected to negative charge bar 16. The plates 2 and 3 are separated and do not contact each other by reason of being positioned in the spaced grooves 14.

Current passes through the electrolyte between the plates 2 and 3, causing electrolytic deposition to be accomplished, forming positive and negative plates.

The charge bar 1 may be made of any suitable conductive material. However, the particular embodiment shown in the drawing is a lead extrusion of 3% antimonial lead.

Charge bar 1 is of substantially rectangular cross section having a groove 22 formed in the lower edge thereof, illustrated in FIG. III. An elongated pear-shaped channel 24, communicating with one side of groove 22, has an expandable tube 26 disposed therein. The tube 26 may be of rubber, plastic, or any other suitable resilient material which has expansion characteristics when internal fluid pressure is applied thereinto.

Tube 22 has an inlet conduit 28 and an outlet conduit 30 communicating therewith at opposite ends thereof to which air supply hoses 32 and 36 are connected.

As best seen in FIG. I of the drawing, air under pressure is provided from a source of compressed air such as blower 34 through air hose 32 to the inlet 28 on the first charge bar 1. Air flows through tube 26 to outlet 30 to which is connected a second air hose 36.

The second air hose 36 passes through the inside of the tank to an opening 40 in the end 10 of tank 6. The opening is slightly larger than the collapsed diameter of the hose 36 whereby electrolyte may be drained from the tank 6 when the hose is not distended. When air pressure is applied the hose 36 expands, plugging the drain hole 40, allowing the tank 6 to be filled and retain the electrolyte therein as long as the tube is expanded.

Air hose 36 connects the outlet 30 of the first charge bar 1 through drain hole 40 in the first tank 6 through drain hole 40a in a second tank 6a to the inlet 28a of a second charge bar 1a. A third air hose 38 is connected to the outlet 30a of the second charge bar 1a through which a third charge bar may be connected with the source of air 34.

It should be readily apparent from the foregoing that the pressure source 34 may be connected to any number of expansible connector tubes 26 associated with electrolyte tanks whereby the tube 26 of each connector bar 1 will expand to form an electrical connection between the connector bar 1 and lugs 4 on plates disposed in the electrolyte tanks 6 while simultaneously closing drain holes 40 and 40a of each tank.

Terminal 42 is provided at one end of each connector bar 1 and 1a to facilitate connecting the connector bars to an electrical DC power supply 46. Terminals 44 and 44a are provided on one end of each charge bar 16. It is desirable to provide means for reversing polarity of the charge bars 1, 1a and 16 to prevent excessive electrolytic deposition on the charge bar 16 which is submerged in electrolyte. A schematic diagram of suitable circuitry is shown in FIG. I of the drawing in which a source of electric power 46 is connected to a two-pole double throw switch 48.

It should be readily apparent from FIG. I of the drawing that when the switch 48 is in the right-hand position 48a terminals 42 of charge bar 1 will have a positive charge. Terminal 44 on lower charge bar 16 will be connected to the negative side of power supply 46.

It should also be apparent that when the switch 48 is in the left-hand position 48b the polarity will be reversed thereby connecting terminals 42 and 42a of charge bars 1 and 1a with the negative side of power supply 46 while connecting the terminals 44 and 44a of lower charge bars 16 with the positive side of the power supply 46.

While the wiring diagram shown in FIG. I of the drawing illustrates the charge bars of separate electrolyte tanks 6 and 6a connected in parallel, it should be obvious that they may be connected in series if it is more desirable to do so in a given situation depending upon the number of tanks, the number of plates in each tank and the resistance in the system.

OPERATION

The operation and function of the device described above will now be explained.

Plates 2 and 3 are positioned in the electrolyte tanks 6 and 6a as hereinbefore described. Lugs 4 and 4a of alternate plates 3 and 3a are held in contact with charge bars 16 at the lower portion of the tanks 6 and 6a by the force of gravity. Lugs 4 on plates 2, positioned on the opposite side of the tank from the lugs on plates 3, are inserted into groove 22 on the charge bars 1 and 1a.

After the plates 2, 2a, 3 and 3a, and the charge bars 1 and 1a are properly positioned with respect to the tanks 6 and 6a, the source of compressed air 34 is energized causing air to flow through hose 32, tube 26, hose 36, tube 26a and hose 38 to the last tank in the series which will be the end of the pressure line.

When the compressed air is released to the system, tubes 26 and 26a will expand into grooves 22 forcing lugs 4 and 4a into contact with the connector bars 1 and 1a. Simultnaeously, air hose 36 will expand, closing the drain holes 40 and 40a in each tank. At this time, in the sequence of operation, all plates are connected to the respective charge bars 1 or 16 and the drain holes 40 and 40a in each electrolyte tank is plugged.

After electrolyte is placed in the tanks 6 and 6a, switch 48 may be closed, making an electric circuit from terminals 42, 42a of charge bars 1 and 1a through the lugs 4 and 4a on plates 2 and 2a through the plate, through the electrolyte to plates 3 and 3a, through lugs 4 and 4a on plates 3 and 3a to the connector bars 16 to terminals 44 and 44a which are connected to the opposite side of source of electric current 46. To prevent excessive deposition of material on connector bars 16, switch 48 may be thrown to the left-hand position when a second batch of plates is being formed, thereby reversing the polarity of the current through the tank to remove the deposited material by the process of electrolysis from connector bar 16.

After the plates have been formed, the source of compressed air 34 is disconnected from air hose 32 thereby deflating the system. Tubes 26 and hose 36 collapse, thereby disconnecting the lugs 4 and 4a from connector bar 1 and 1a, allowing the electrolyte to drain out of tanks 6 and 6a through holes 40 and 40a.

Connector bars 1 and 1a may be connected to the tank by links or any other suitable means whereby the bars may be swung or pivoted to any desirable position, allowing the plates 2, 2a, 3 and 3a to be removed from the tanks 6 and 6a.

The plates 2 and 3 may be separated along perforations 18 into sections 2', 2'', 3' and 3'' to be installed and sealed in a battery case.

DESCRIPTION OF A SECOND EMBODIMENT

A second embodiment of the invention is illustrated in FIGS. VI, VII and VIII of the drawing.

Generally, no difficulty is encountered in maintaining contact between lugs 4 on the lead plates or grids with a negative terminal while the plates are being formed. However, the positive terminal tends to repel the lead plates thereby breaking the electrical contact.

Normally the weight of the lead plates is sufficient for maintaining contact between an electrode disposed in a lower portion of the electrolyte tank as heretofore discussed in the description of the preferred embodiment. However, in certain situations it may be desirable to utilize the novel charge bar attachment means which I have developed for both the positive and negative terminals.

The positive and negative terminals may both be disposed at the top of the electrolyte tank, both at the bottom of the tank, or one at the top and the other at the bottom. The embodiment shown in FIGS. VI and VII of the drawing illustrates a configuration in which both terminals are disposed in a lower portion of the electrolyte tank.

This particular arrangement offers the advantage of allowing the charge bars to be permanently installed in a fixed position, thereby eliminating the necessity for moving the charge bar to remove the plates from the tank. Positive plates 2 may be inserted in the vertical grooves 14 and lugs 4 extending into groove 22 of charge bar 1c while the other side of the plate is supported on bottom 14b of vertical groove 14. When the positive plate 2 is so positioned, it is in contact with the positive terminal 1c while being supported by bottom 14b of vertical groove 14 in spaced apart relation from terminal 1d.

Lug 4 of negative plate 3 extends into groove 22 of charge bar 1d while being supported by bottom 14b of vertical groove 14 in spaced apart relation from charge bar 1c.

Resilient tube 26 extends through the end sections 1e of charge bars 1c and 1d through opening 40b in a lower portion of electrolyte tank 6 whereby a continuous tube 26 may be threaded through openings 40b, through canal 24 of charge bar 1c, through opening 40b at the opposite end of the electrolyte tank, through opening 40c in the other side of the tank back through charge bar 1d.

The use of a single continuous tube 26 eliminates the need for expensive couplings and connections for joining sections of tubing resulting in very simple, inexpensive equipment, allowing a positive connection to be made by merely opening an air valve. The electrical contact is broken by merely releasing the pressure in tube 26, causing tube 26 to relax, simultaneously releasing lugs 4 on the plates 2 and 3 while allowing the electrolyte to drain out through openings 40b and 40c.

A section to tubing 26a, less resilient than tube 26, may enclose portions of tube 26 extending outside tank 6 to reduce expansion of said tube except in the charge bars and the drain openings.

It will be understood that other and further embodiments of my invention may be made without departing from the spirit and scope of the appended claims.

Having described my invention, I claim:

1. In apparatus for forming plates for storage batteries, an electrolyte tank; a plurality of spaced apart grids in the tank, each grid having a lug at opposite corners of at least one side thereof; a source of electricity; a first charge bar in a lower portion of the tank in contact with lugs on alternate grids said charge bar being connected to the negative side of a source of DC electricity, a second charge bar adjacent an upper portion of the tank said second charge bar being connected to lugs on alternate grids and to the positive side of the source of electricity; and means for detachably securing lugs of alternate grids to the second charge bar, said means includes a groove in the lower side thereof; expandable resilient means adjacent the groove and means for expanding the resilient means against the lugs to grip the lugs in the groove.

2. The combination called for in claim 1 wherein the resilient means is an expandable tube having a portion thereof protruding into the groove when in the expanded condition thereby forcing the lugs on the grids into contact with a side of the groove.

3. The combination called for in claim 2 wherein the means for expanding the tube is a source of compressed fluid connected to the tube for inflating the tube.

4. The combination called for in claim 3 with the addition of a drain hole in a lower portion of the tank and the expandable tube extends through the drain hole whereby the drain hole is sealed when the tube is inflated.

5. In apparatus for electroplating, comprising a combination therewith a connector for making a contact between conductors of electricity; a terminal on a first conductor for connection to a second conductor; a groove in the second conductor; an expandable resilient member adjacent said groove; and means for expanding said resilient member to grip the terminal on the first conductor in the groove, thereby forming an electrical contact between the first and second conductors.

6. The combination called for in claim 5 wherein the groove in the second conductor is elongated whereby a plurality of terminals may be gripped therein.

7. The combination called for in claim 5 wherein the expandable member is a tube, and the means for expanding same is a source of fluid under pressure communicating therewith.

8. In apparatus for forming battery plates having terminal lugs thereon, comprising in combination therewith a connection to deliver electricity to alternate grids in an electrolyte tank to be used in dry plate formation for storage battery plates having terminal lugs thereon, comprising: a charge bar; a groove extending along one side of said bar; a channel in said bar communicating with the groove; a resilient tube in said channel; an inlet port associated with the resilient tube whereby fluid under pressure may be injected into the tube to cause it to expand into the groove, thereby making an electrical contact between the terminals and a side of the groove; and a source of fluid under pressure communicating with the inlet port.

9. The combination called for in claim 8 with the addition of outlet port associated with said tube in spaced apart relationship to the inlet port whereby a series of tubes in charge bars may be inflated by a single source of fluid under pressure.

10. In a device for forming battery plates; an electrolyte tank; a charge bar extending along one side of the tank; a charge bar extending along the opposite side of the tank; means for spacedly positioning grids to be charged in said tank, said grids alternately making electrical contact with said charge bars, at least one of said charge bars having a groove along the lower side thereof, and a channel formed therein communicating with the groove; an expandable tubular member disposed in the channel; a source of fluid under pressure communicating with the tubular member to expand same; and means on the grids extendable into the groove in position to be contacted by the tubular member when expanded to press same against the wall of the groove.

11. The combination called for in claim 10 with the addition of a drain hole in the wall of the tank, and the tubular member extends through the drain hole whereby upon expansion of the tubular member the drain hole is closed and sealed.

References Cited
UNITED STATES PATENTS

| | | | |
|---|---|---|---|
| 2,356,006 | 8/1944 | Samer | 136—81X |
| 2,956,258 | 10/1960 | Raddin | 339—117X |
| 2,978,666 | 4/1961 | McGregor | 339—117X |
| 3,022,481 | 2/1962 | Stepoway | 339—75 |
| 3,090,823 | 5/1963 | Roach | 136—82 |
| 3,366,916 | 1/1968 | Oktay | 339—117X |

ALLEN B. CURTIS, Primary Examiner

A. SKAPARS, Assistant Examiner

U.S. Cl. X.R.

136—134; 339—117, 174; 204—287